July 19, 1960

J. S. KAMBORIAN 2,946,041

AIRCRAFT LANDING AID

Filed June 7, 1956

Inventor
Jacob S. Kamborian
by Roberts, Cushman & Grover
Attys

July 19, 1960   J. S. KAMBORIAN   2,946,041
AIRCRAFT LANDING AID
Filed June 7, 1956   2 Sheets-Sheet 2

Inventor
Jacob S. Kamborian
by Roberts, Cushman & Grover
Attys

United States Patent Office 2,946,041
Patented July 19, 1960

2,946,041

AIRCRAFT LANDING AID

Jacob S. Kamborian, % International Shoe Machine Corp., West Newton, Mass. (292 Main St., Cambridge, Mass.)

Filed June 7, 1956, Ser. No. 589,951

12 Claims. (Cl. 340—26)

This invention relates to landing aircraft in the fog or the like and more especially to visually perceptive means for guiding an aircraft at its approach level into the proper lane above the landing strip assigned to it and assisting in bringing it down at a proper rate of descent for safe landing.

Objects of the invention are to provide visually perceptive means which will define a glide path along which the plane should travel to stay on a track with the strip and the altitude and speed at which the plane should travel at any given time as it descends along the glide path to the landing strip. Other objects are to provide means for defining the glide path which does not require light sources of high candle power and which does not transect the line of flight so as to blind the pilot or produce reflection or distortion which might confuse the pilot. Another object is to provide a visible glide path which exists only at the altitude it is intended to be indicative of at any given point so that there is no possibility of deception as to the level at any given time. Another object is to provide a glide path which is independent of weather conditions and which may be established at any altitude without loss of effectiveness. Another object is to provide means for establishing a visible glide path which is not harmful to the aircraft, pilot or personnel of the airport. Other objects are to provide means for establishing a glide path which is of simple construction, easy to operate, mobile so that it can be transferred from one strip to another if desired, which is inexpensive to maintain in use and is dependable.

As herein illustrated and in accordance with the invention a glide path or track of visible light is established in space above the airport at the approach end of the landing strip, at a rate consistent with safe landing speed. Preferably there are two tracks, one at each side of the landing strip, which rise upwardly and rearwardly therefrom along an inclination which corresponds with a normal glide path and which terminates substantially at flight level. The tracks are created by projecting finite bodies of substance capable of emitting light throughout their flight and of giving forth extra brilliance at their summits of flight prior to extinguishment to mark or provide beacons at the entrance of the path defined by the tracks. Projection of the elements is timed so that the intervals between projections is substantially imperceptible and hence create the illusion of continuity. The light emitting bodies are launched from one or more projectors of suitable kind arranged at opposite sides of the landing strip and in accordance with preferred practice the bodies at one side are selected to emit a light of different color from those at the other side, thereby to indicate the right and left-hand sides of the path. Preferably the bodies are also self-extinguishing and made of a substance which will be completely consumed by the time they reach the end of their flight; however, in the absence of the availability of such material tracer bullets such as commonly used by the Armed Forces may be employed. Propulsion may be mechanical, pneumatic, electrical or by a charge of explosives.

Alternatively the glide path is comprised of a plurality of horizontal bars of light which extend transversely of the line of flight, successive bars descending from flight level to the runway. The successive bars or zones are of different color, each color being indicative of the altitude of the glide path at that place and of the air speed at which the plane should be traveling. Preferably the zones of light at the flight level are wider than the runway and become narrower progressively as they descend to the width of the air strip. The zones of light forming the path are constituted by bodies which commence to emit light at a predetermined height from the ground and extinguish at a predetermined height above their point of becoming luminescent so as to form a distinctive layer of light. The zones of which the layer is constituted are created by projecting finite bodies of substance capable of emitting light after they have risen to a predetermined height and of extinguishing when they reach the summit of their flight. Projection of the elements is timed so that the intervals between projections is imperceptible and hence the light layer appears to be continuous because of visual persistence. The light emitting bodies are launched from one or more projectors and at successively lower levels from flight level to the runway so that the loci of the summits of flight of the several bodies form a sloping glide path descending from flight level to the runway. Preferably the bodies are self-extinguishing but are compounded to give off a greater brilliance just before extinguishment.

The invention will now be described in greater detail with reference to the accompanying drawings wherein.

In spite of the many instruments and systems available for landing aircraft blind there is still considerable difficulty encountered in bringing a plane in under low ceiling conditions especially in a fog. Thus planes frequently stay aloft many hours in spite of dwindling supplies of fuel waiting for a break in the fog before attempting to land or proceed to another airport. High candle power search lights and beacons except for the last few feet of descent are largely ineffective because of the light diffusing character of fog which renders these invisible at any great distance. Furthermore high candle power lamps produce dangerous glare and blinding of the pilot.

In spite of the shortcomings of ordinary search lights and beacons, visual perception is still the most dependable for assisting a pilot to orient himself if it is reliable and it is the purpose of the invention to provide light which will assist rather than confuse the pilot. The novel lighting means employed herein is in the form of spaced tracks of light which extend from flight level far in advance of the approach end of the runway, forwardly and downwardly to ground level along a sloping path, for guiding the pilot into line with the landing strip which has been assigned to him for landing purposes and for guiding him downwardly at the proper rate to reach the end of the landing strip at the proper place and at the proper speed. The preferred glide path is shown in Figs. 1 to 5 inclusive.

Figure 1:
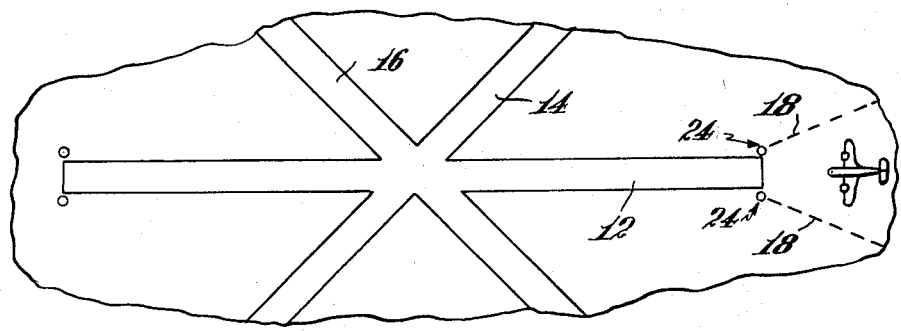
Fig. 1 is a plan view of a landing field showing several landing strips with guide tracks at an end of one of the strips defining a path of descent for a plane.
Figure 2:
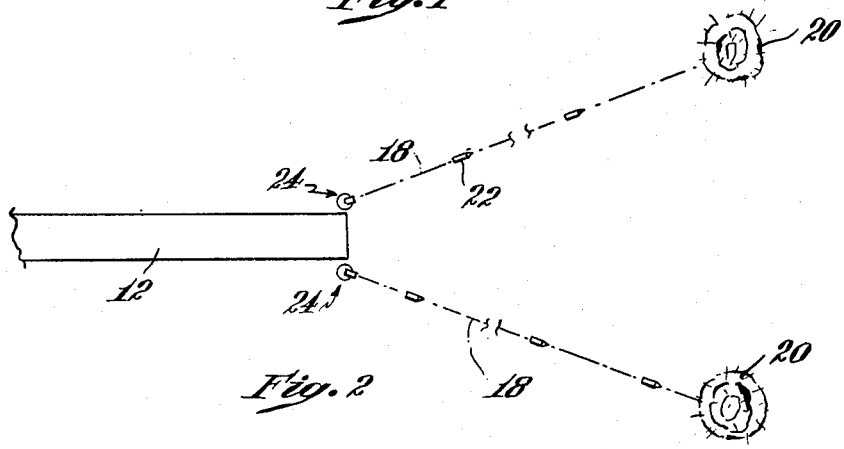
Fig. 2 is a plan view to very much larger scale showing an end of a strip with the tracks diverging therefrom and with beacons at their upper ends.

Referring to Fig. 1, there is shown a plan view of a conventional landing field on which there are landing strips or runways 12, 14 and 16 of macadam or cement arranged to permit takeoff and/or landing in any direction. In accordance with the invention tracks of light 18—18 are set up which commence at ground level near or at the landing end of the landing strip and rise upwardly and rearwardly therefrom along an inclination which corresponds with the normal glide path of a plane so that a plane traveling along between the tracks and at the same rate of descent as the tracks will land on the strip at the proper ground speed. Preferably the tracks 18—18 diverge as they extend rearwardly so as to make a wide entrance to the space therebetween and the upper extremities of the tracks are defined by beacons 20—20 produced, as will appear hereinafter, so as to mark the entrance to the glide path defined by the tracks 18—18.

The tracks are produced by bodies 22 projected upwardly and rearwardly from the landing end of the strip along courses which correspond to the inclination of the glide path, which bodies are capable of emitting light of a given color. Preferably the bodies for producing the track at one side of the runway are of a different color from those employed for the other side so as to identify right and left-hand sides of the path of descent. The bodies are projected to a height corresponding to normal flight level and are made up of a suitable material which will give forth light continuously during their flight up to the summit of their flight, whereupon they will give forth a burst of extra brilliance and then extinguish. The purpose of the burst of light at the end of the flight is to establish the beacons 20 at normal flight level, marking the entrance to the path between the tracks. The bodies are projected at a fast enough rate so that there is no lack of continuity that is, so that there is an illusion of continuous light from the landing end of the strip upwardly along the glide path to the normal flight level marked by the beacons.

The light emitting bodies are comprised of suitable chemical material for giving forth the necessary light during their flight and then bursting at the end of their flight to give extra light and preferably are designed to be completely consumed at the end of their flight so that there is nothing to drop to the ground with possible injury to persons or property therebelow. In the absence of having such special material available and where there is little dange of injury to persons below or where the emergency is the main consideration, tracer bullets, such as are used by the Armed Forces to assist in obtaining range, may be employed, although these would not provide the beacons mentioned for marking the entrance to the glide path.

The tracks 18—18 may be set up by means of projectors 24—24 located at opposite sides of the landing strip, near their approach ends, the type of the projector being a matter of choice and depending somewhat on the light emitting bodies to be projected. While under normal conditions electrically and pneumatically operated means may be desirable because of the ease of operation, mechanically operated means may be desirable to supplement these other means to provide for possible power failure. Alternatively material may be used which is self-propelling, that is, is provided with an explosive propellent such as a Roman candle type of pyrotechnic. In the event of using tracer bullets, for example in the event of an emergency landing without other available equipment, rifles might be used to project the tracers by setting them up at the proper angle.

Figure 4:
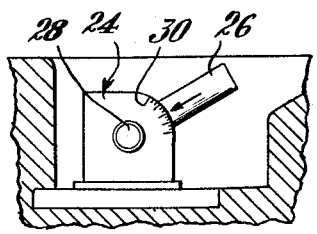
Fig. 4 is an elevation of a projector.
Figure 5:
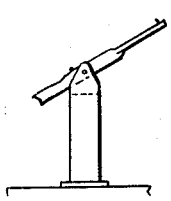
Fig. 5 is an elevation of a rifle set up to project tracer bullets.
Figure 3:
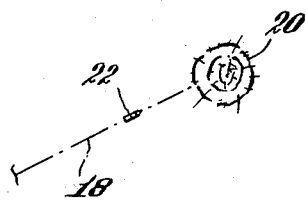
Fig. 3 is an elevation showing the inclination of the tracks and with beacons at their upper ends.
Figure 3:
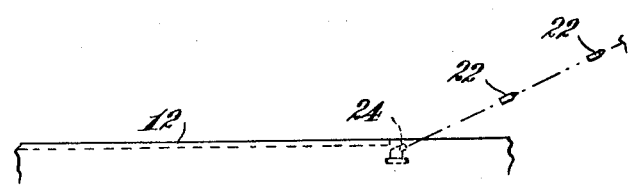

The projectors 24—24 may be permanently installed or arranged to be movable from one end of a landing strip to another so as to be available for whatever strip is in use. Preferably they are set down into the ground so as to be substantially level with the surface. In any event the projector must be adjustable to provide for setting the inclination for projection such that the projected body will follow the course of the glide path. Because of the length of the path the adjustment must be made with accuracy and hence as shown in Fig. 4, the projector is provided with a short barrel 26 which is angularly adjustable by means of a wheel 28 with reference to its scale 30. If a rifle is used it may be set up in a support or rest as shown in Fig. 5.

Figure 6:
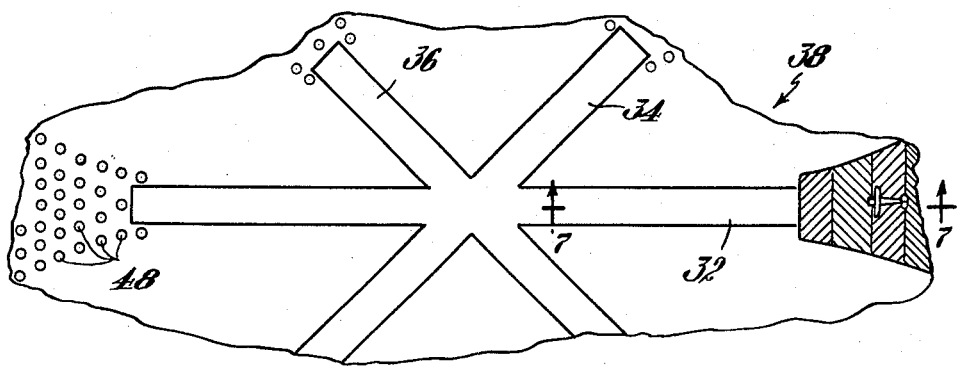
Fig. 6 is a plan view of a landing field showing several landing strips with a light path corresponding to inclination to a normal glide path shown at one end of the strip and a distribution of projectors at the opposite end for setting up a path at that end.
Figure 7:
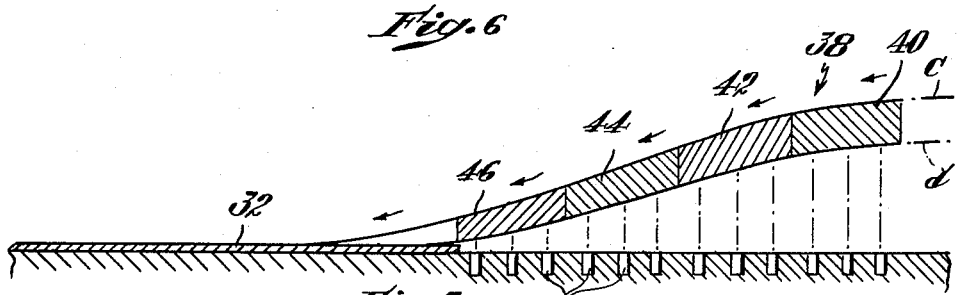
Fig. 7 is a vertical section to larger scale taken on the line 7—7 of Fig. 6, along one of the landing strips and showing the novel light path in section extending from flight level downwardly to the level of the landing strip.
Figure 8:
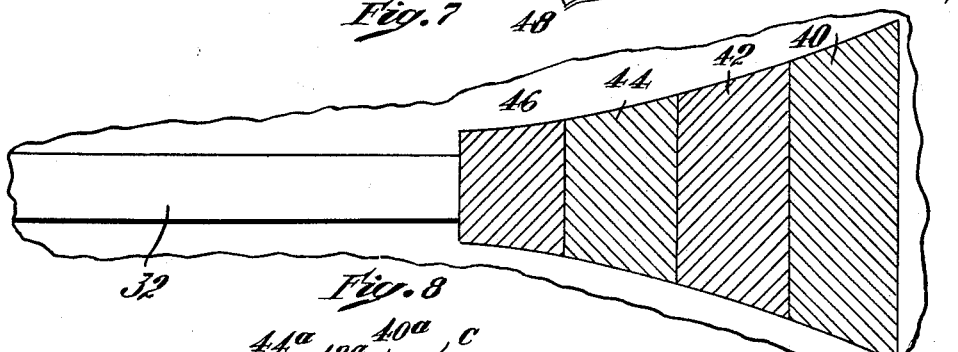
Fig. 8 is a plan view of the light path and a portion of the landing strip looking down at the top of Fig. 2.
Figure 9:
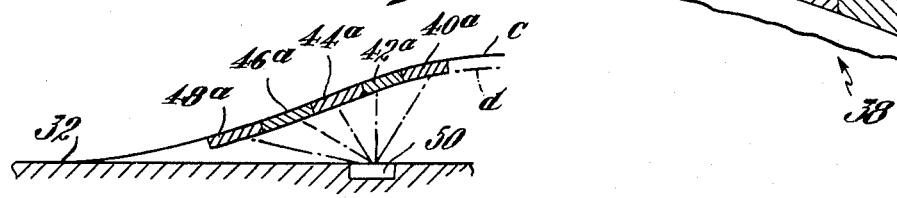
Fig. 9 shows an alternative means for establishing a light path.
Figure 10:
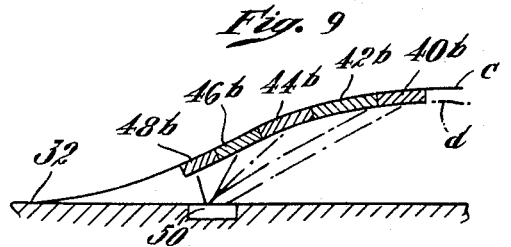
Fig. 10 shows still another means for establishing a light path.

The alternative glide path is shown in Figs. 6 to 10 inclusive. Referring to Fig. 6 there is shown a plan view of the landing field on which there are landing strips or runways 32, 34 and 36 of macadam or cement arranged to permit take-off and/or landing in any direction. In accordance with the invention a path of light 38 (Fig. 7) is set up which commences above the ground ahead of the approach end of the strip at flight level and descends at a rate which is consistent with the forward speed of the plane to bring the plane down on the strip at the proper ground speed. The path is constituted by a plurality of horizontal zones of light extending transversely of the direction of flight (Fig. 7) and forms a descending carpet of light. Preferably the zones are longest at flight level and become shorter as they approach the landing strip as indicated in Fig. 8, thus providing a funnel-like entrance for assisting the plane to enter the path.

Means for setting up the path will be provided at each end of the strip, however, only that at the end at which the plane is approaching will be used at any given time.

The on-course signal for planes approaching an airport may be as far as 25 miles from the runway and the glide slope may commence as far away as 10 miles. While generally it is not possible to start the visible ramp as far away as 10 miles for lack of available ground, it may be set up within a distance of 3 or 4 miles to commence at a level of approximately 1000 feet. The distance or altitude at which the ramp will start will, of course, depend entirely upon the conditions available and the type of plane and it is within the scope of the invention to extend or limit the commencement of the ramp in accordance with the specific conditions which must be met. By way of example the ramp as shown in vertical section herein consists of a plurality of zones of light 40, 42, 44 and 46, four such zones being identified which form a lane of light. The top zone may be at 1000 feet, the second zone at 750 feet, the third zone at 500 feet and the fourth zone at 250 feet. These zones are closely adjacent so that they provide a substantially continuous path. Each zone is of a different color, each color representing a given altitude and the speed at which the plane should be flying when in that zone to insure safe landing. The colors are, of course, a matter of choice but are herein indicated as yellow, green, blue and red, commencing at flight level and descending to ground level.

A particular advantage of this arrangement of light forming a glide path beneath the plane is that the plane can follow it much like a roller-coaster follows a track without getting a strong glare or beam of light such as would be produced by projected light and which may momentarily blind the pilot, for it is only necessary to fly along the upper surface of the path substantially parallel thereto.

The path may be maintained by distributing a plurality of projectors 48 along the ground in advance of the runway, starting at a wider spacing than the runway and converging as previously explained toward the sides of the runway. The projectors may be permanent emplacements preferably below the surface of the ground, or mobile so as to be movable from one end of an air strip to the other or from one strip to another as becomes necessary. Each projector may contain a plurality of finite bodies which are potentially capable of emitting light and means for propelling them upwardly into the air with respect to the surface of the runway. The projected bodies are designed to emit light within a predetermined time after launching, to remain luminescent for a predetermined short time after becoming luminescent so as to provide a zone of predetermined depth. Thus it is possible to have bodies projected which will produce a zone of red light at a height of approximately 250 feet, a blue light at 500 feet, a green light at 750 feet and a yellow light at 1000 feet. As shown in Fig. 6, a number of projectors are provided, distributed longitudinally and transversely of the line of flight and each may contain quantities of these bodies. To provide the appearance of a continuous path the bodies must be projected at such rates that the intervals between luminescence are indistinguishable.

The projectors may be electrically, pneumatically or mechanically operated. Alternatively, material may be used which is self-propelling that is, is provided with an explosive propellant such as the Roman candle-type of pyrotechnic, designed either to be set off automatically or by hand, the latter being useful at places where electric power has failed or is not easily available. Preferably the bodies are designed to emit light most brilliantly just as they reach the summit of their flight, for example, by giving out a burst of light as a preliminary to complete extinguishment.

Instead of employing a plurality of projectors distributed along the line of flight one or more projectors 50 may be arranged at each side of the strip, for example at its approach end (Figs. 9 and 10) which are adapted to project a plurality of bodies at different angles in a vertical plane, thereby to provide a spread of light longitudinally of the line of flight. Such projection may be either in the same direction as that from which the plane is approaching or the opposite direction. Thus in Fig. 9 the zones 40a, 42a, 44a, 46a and 48a are set up and in Fig. 10, zones 40b, 42b, 44b, 46b and 48b are set up. These may be arranged to set up continuous zones of light widthwise of the landing strip or spaced parallel lanes of light at each side of the strip.

By whatever means the path is established it is important to maintain a layer of light which has a distinct upper and lower limits c and d (Fig. 7), so that above the layer there is substantially no light and below the layer there is substantially no light thus clearly establishing the ramp in space above the landing strip. It is only by establishing a distinct layer in space that the altitude at any given point can be definitely fixed.

As previously stated the plane at no time faces or flies into a source of light hence there is no possibility for the aviator to become blinded nor are there any strong beams of light transecting the line of flight which might spoil his judgement or distort the atmospheric conditions. Further advantages reside in the fact that the light is produced at the level at which it is intended to be seen so that no matter how foggy or murky the atmosphere may be the light is not diminished or rendered inefficient by having to pass through a long distance before it becomes useful. Thus it is possible to maintain clearly definitive lighting under the most adverse conditions.

It should be understood that the present disclosure is for the purpose of illustration only and that this invention includes all modifications and equivalents which fall within the scope of the appended claims.

I claim:

1. Aircraft guiding means for assisting in bringing a plane down to the landing end of a landing strip when visibility is low, comprising a light track rising along a rearwardly and upwardly extending path from the landing end of the strip to approximately normal flight level, the inclination of the path corresponding to the normal glide path of a plane, said track being constituted by a plurality of finite bodies travelling one after another through space above the landing strip which luminesce at such time as to define the limits of the glide path, and means for projecting said bodies at frequent enough intervals to maintain a continuously visible track throughout the time required for the plane to make a landing.

2. Aircraft guiding means for assisting in bringing a plane down to the landing end of the landing strip when visibility is low, comprising spaced light tracks arranged at opposite sides of the landing strip and rising therefrom along a rearwardly and upwardly extending path to approximately normal flight level, the inclination of the path of the tracks corresponding to the normal glide path of a plane, said track being constituted by a plurality of finite bodies travelling one after another in space along a trajectory corresponding to the flight path and which luminesce throughout a predetermined period of time as to define the limits of the glide path and means for projecting said bodies at frequent enough intervals along their trajectories to maintain continuously visible tracks throughout the time required for the plane to make a landing.

3. Aircraft guiding means for assisting in bringing a plane down to the landing end of a landing strip when visibility is low, comprising light tracks arranged at opposite sides of the landing strip, said tracks rising rearwardly and upwardly therefrom along an inclination corresponding to the normal glide path, said tracks being constituted by a succession of finite luminescent bodies travelling close enough, one after another, so that their luminescence creates an illusion of continuity, each body upon reaching its summit of flight giving forth a burst of light thus to mark the entrance to the space between the tracks.

4. Aircraft guiding means comprising spaced light tracks arranged at opposite sides of a landing strip, said tracks rising rearwardly and upwardly therefrom along an inclination which corresponds to a normal glide path, said tracks being constituted by successively projected bullet-like tracers fired at close enough intervals to create the illusion of continuity, each body upon reaching its summit of flight giving forth extra brilliance prior to its extinguishment so as to mark the entrance to the space between the tracks.

5. Aircraft guiding means according to claim 2, wherein the means projecting the bodies are located at the landing end of the strip.

6. Aircraft guiding means according to claim 2, wherein the means for projecting the bodies are projectors located at the landing end of the strip which are adjustable in inclination for projecting the bodies along the course of the glide path.

7. Aircraft guiding means for assisting in bringing a plane down to the landing end of a landing strip when visibility is low, comprising a carpet of visible light extending rearwardly from the landing end of the landing strip in the direction from which the plane is approaching and upwardly therefrom to normal flight level along a path corresponding to the normal path of descent of a plane traveling at a given air speed, said carpet being elevated from the landing strip and having a vertical thickness which is defined by finite bodies travelling upwardly through space, which are designed to become luminescent at a predetermined height and to extinguish at a predetermined greater height, the vertical distance of luminescence and extinguishment corresponding to the desired depth of the carpet.

8. Aircraft guiding means according to claim 7, wherein the lower surface of the carpet is defined by ignition of the finite bodies and the upper surface by the extinguishment of said bodies.

9. Aircraft guiding means according to claim 2, wherein the spaced light tracks diverge rearwardly so as to provide an entrance to the space between the tracks.

10. Aircraft guiding means for assisting in bringing a plane down to the landing end of the landing strip when visibility is low, comprising spaced light tracks arranged at opposite sides of the landing strip and rising therefrom along a rearwardly and upwardly extending path to approximately normal flight level, the inclination of the path of the tracks corresponding to the normal glide path of a plane, said tracks being constituted by a plurality of tracer bullets travelling one after another through space above the landing strip which luminesce at such time as to define the limits of the glide path, and means for projecting said bodies at frequent enough intervals to maintain a continuously visible track throughout the time required for the plane to make a landing.

11. Aircraft guiding means for assisting in bringing a plane down to the landing end of the landing strip when visibility is low, comprising spaced light tracks arranged at opposite sides of the landing strip and rising therefrom along a rearwardly and upwardly extending path to approximately normal flight level, the inclination of the path of the tracks corresponding to the normal glide path of a plane, said tracks being constituted by a plurality of tracer bullets travelling one after another through space above the landing strip which luminesce at such time as to define the limits of the glide path, rifles for projecting said bodies at frequent enough intervals to maintain a continuously visible track throughout the time required for the plane to make a landing, and means supporting said rifles for angular adjustment in elevation.

12. Aircraft guiding means according to claim 7, wherein the luminescent bodies throughout predetermined zones lengthwise and widthwise of the carpet are designed to produce in each zone a uniform color, but in adjacent zones different colors, each colored zone along the carpet being indicative of a given altitude and the air speed at which the plane should be travelling at that altitude for proper landing.

References Cited in the file of this patent
UNITED STATES PATENTS

| | | |
|---|---|---|
| 2,572,451 | Custer | Oct. 23, 1951 |
| 2,597,321 | Hergenrother | May 20, 1952 |
| 2,669,703 | Hammond | Feb. 16, 1954 |